United States Patent
Hudson et al.

[11] 3,922,628
[45] Nov. 25, 1975

[54] STRAIN GAGE

[75] Inventors: John M. Hudson; John E. Axley, both of Cincinnati, Ohio

[73] Assignee: General Electric Company, Cincinnati, Ohio

[22] Filed: Aug. 3, 1970

[21] Appl. No.: 60,664

[52] U.S. Cl. ................................. 338/2; 338/329
[51] Int. Cl.² ........................................ G01L 1/22
[58] Field of Search ......................... 338/2, 329

[56] References Cited
UNITED STATES PATENTS

| | | | |
|---|---|---|---|
| 2,390,038 | 11/1945 | Ruge | 338/2 |
| 3,527,099 | 9/1970 | Hevceg | 338/2 |

FOREIGN PATENTS OR APPLICATIONS

| | | | |
|---|---|---|---|
| 612,833 | 11/1948 | United Kingdom | 338/2 |
| 1,097,761 | 1/1968 | United Kingdom | 338/2 |

Primary Examiner—T. H. Tubbesing
Attorney, Agent, or Firm—Dana F. Bigelow; Derek P. Lawrence

[57] ABSTRACT

A strain gage is disclosed comprising a backing strip and a strain grid having enlarged terminal lengths. Elongated tabs having integral, tapered connectors are also bonded to the backing strip. The connectors are bonded to the enlarged terminal lengths and are angled therefrom at approximately 45° – 65° from the direction of major strain when the gage is bonded to a test specimen. The tabs are also disposed in the same angular relationship. A cover sheet overlies the grid and tabs with apertures providing access to the latter.

3 Claims, 1 Drawing Figure

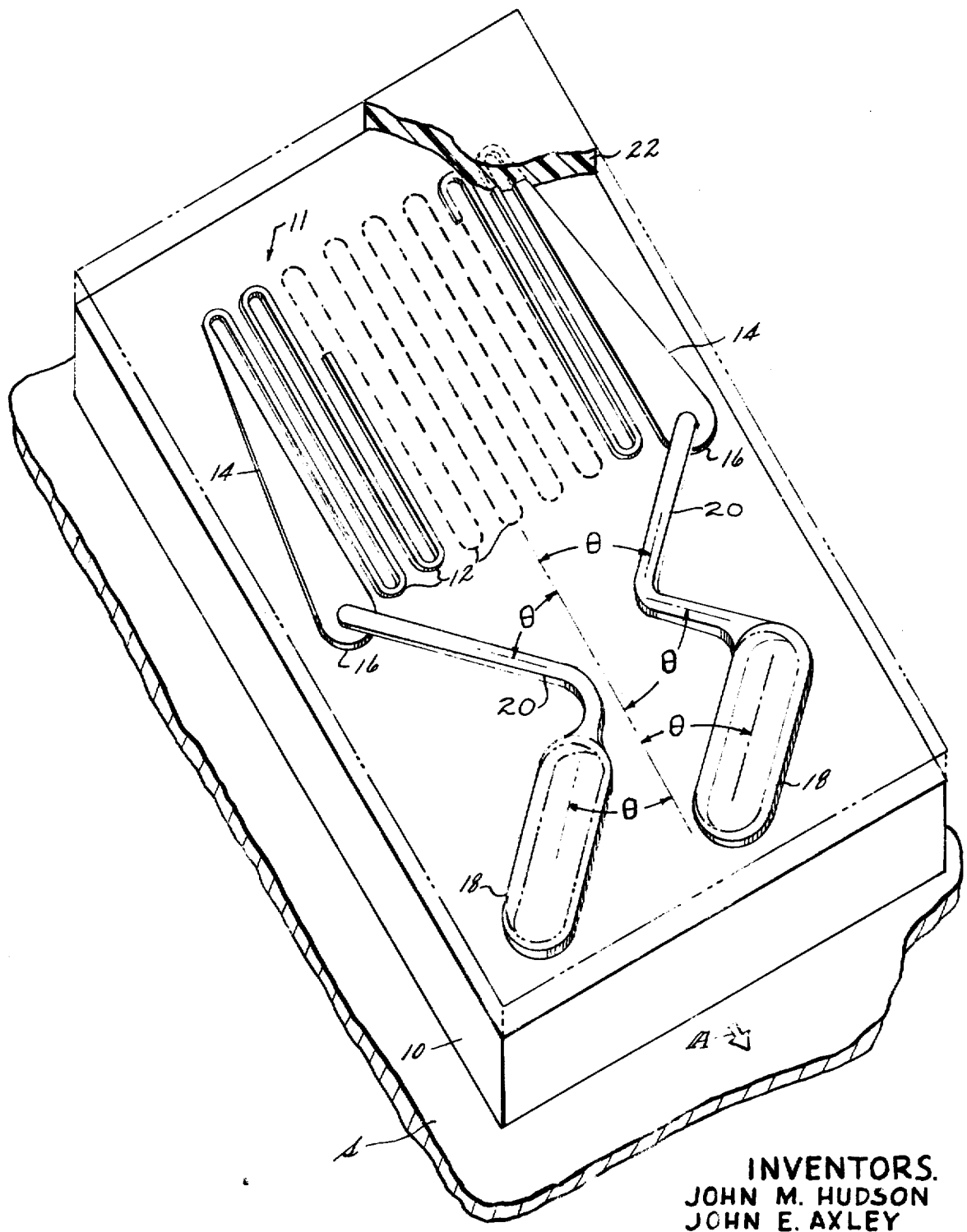

STRAIN GAGE

The present invention relates to improvements in strain gages.

Strain gages comprise a strain grid formed by an elongated conductor, usually of a serpentine configuration having a plurality of parallel lengths. This grid is bonded to a backing strip. The backing strip is applied to a test specimen with the parallel lengths of the grid aligned with the direction of major force (or strain) to be induced on the workpiece. Strain induced on the workpiece results in a change in the cross-sectional area of the grid lengths and a consequent change in the electrical resistance of the conductor. This change in electrical resistance can be measured and calibrated to determine the strain, and stress, induced in the test specimen.

In order to obtain accuracy, the strain grid is formed of wire or foil having an extremely small cross section. Foil grids, for example, may have a thickness in the order of .0005 inch and their parallel lengths may have a width in the same order of magnitude.

The strain grid material is generally an iron-nickel-chromium alloy which is difficult to bond to a solder joint. This poses a difficult problem in connecting lead-out wires to the strain grid so that the changes in resistance may be measured to determine the strain induced in a workpiece. While techniques have been developed to bond conductors to the thin material of the strain grid, such techniques require highly controlled conditions which are not generally available in a workshop where a workman would apply the strain gage to the workpiece and then solder the leadout wires in place. For this reason, it has been an accepted practice to provide copper pads on the backing straip which are connected to the strain grid. Solder joints can then be readily made to connect leadout wires to these pads after the strain gage has been mounted on a test specimen.

Prior gages of this type have proven satisfactory for many types of testing but have been found deficient in dynamic test where the test specimen is subject to prolonged cyclic stress as where high frequency vibration is induced in the test specimen. Under such conditions, fatigue failures occur, particularly in the connections between the copper pad and the strain grid and in the solder connections for the leadout wires.

Accordingly, one object of the present invention is to minimize fatigue failures in strain gages.

Another object is to attain the above ends with a compact strain gage which can be installed on test specimens of limited area and limited available area.

Another object is to attain the above ends and, further, to provide additional protection for the fragile components of the strain gage.

These ends are broadly attained in a strain gage comprising a backing strip having a strain grid, in the form of a serpentine conductor having parallel lengths, bonded to its upper surface. The backing strip is adapted to be bonded to a test specimen with the parallel lengths aligned with the direction of major stress to be induced in the test specimen. The terminal grid lengths, at opposite ends of the grid, are progressively widened. A pair of elongated tabs are bonded to the backing strip and have integral connectors, also bonded to the backing strip, respectively, extending to and bonded to the widened ends of the terminal grid lengths. The tabs and the portions of the connectors extending from the terminal grid lengths being disposed, with or without bends, on an angle of between about 45° and 65° relative to lengths of the strain grid. Optionally, a cover sheet may be bonded to the upper surface of the backing strip and the elements mounted thereon. Registered openings provide access to the tabs so that leadout wires may be soldered thereto.

The above and other related objects and features of the invention will be apparent from a reading of the following description of the disclosure found in the accompanying drawing and the novelty thereof pointed out in the appended claims.

The single FIGURE of the drawing is a perspective view, greatly enlarged, with portions broken away and in section, of a strain gage embodying the present invention.

The illustrated strain gage comprises a backing strip 10 having a strain grid 11 bonded to its upper surface. The backing strip 10 is relatively thin and has a relatively low modulus of elasticity. A preferred form of strip is .010 inch polyimide film having a modulus of elasticity of approximately 500,000. The grid 11 comprises a serpentine conductor of extremely small cross section. The serpentine conductor comprises a plurality of parallel lengths 12 which are oriented with the direction of major stress, indicated by arrow A, when the strain gage is mounted on a test specimen s by bonding the backing strip 10 thereto. Such grids are preferably formed by known techniques which involve bonding a metal foil, having a thickness in the order of .0005 inch, to the backing strip, masking the serpentine pattern and then etching away the remainder of the foil.

The terminal lengths 14 of the serpentine grid are tapered in width to enlarged ends 16. These terminal lengths are preferably formed at the same time the serpentine conductor is formed as described above.

Elongated tabs 18 are bonded to the backing strip 10 and are respectively connected to the terminal lengths 14 at their enlarged ends 16 by connectors 20 which are also bonded to the backing. Each tab 18 and its connector 20 are integrally formed preferably by beryllium copper or equivalent solderable and fatigue resistant material. The ends of connectors 20 are bonded to the terminal lengths 14 under controlled conditions which assure a good joint. The ends of the connectors 20 are also very thin to further assure a good bond joint. The connectors then increase in thickness as they extend to the tabs 18. Each connector 20 extends from its terminal length 14 at an angle $\theta$ between 45° and 65° relative to the grid lengths 12. The connectors 20 are first angled toward each other. The right hand connector then bends to the same angle $\theta$ in the opposite direction and joins its elongated tab 18 which is also disposed on the angle $\theta$. The left hand connector 20 bends to the same $\theta$ angle in opposite direction and joins its tab 18 which is spaced from and parallel to the right hand tab 18. This arrangement is preferred since it minimizes the overall outline of the gage.

The angle $\theta$ referenced above would ideally be "Poisson's" angle derived from the Poisson's ratio for a given test specimen. When a test specimen is strained by a unidirectional tensile force, in a positive sense, there is a concomitant negative strain or compression in a plane normal to the tensile force. Along a line at some intermediate angle, i.e., Poisson's angle, there is zero strain. This angle will vary for different materials and for test specimens having bidirectional stress fields.

The latter condition frequently exists under dynamic test conditions such as are found in obtaining strain readings from rotating components.

In any event, it has been found that satisfactory results may be obtained where the $\theta$ angle is maintained within the referenced limits of approximately 45° to 65°. The connectors 20, as they extend from the terminal lengths 14 on this angle, have little or no movement relative to the terminal lengths. This means that there will be no significant forces tending to rupture the bond joint between the connectors 20 and terminal lengths 14. Thus, under fatigue conditions of repeated application and removal of strain to the gage, there is essentially no stress imposed on the bond joint between the connectors 20 and the terminal lengths 14 which would tend to cause failure of this rather delicate bond joint. Further, by having the connectors 20 and tabs 18 bonded to the backing strip 10, they are essentially immune to vibrational forces which could also cause a fatigue failure.

In order to provide protection to the delicate components of the strain gage, a cover sheet 22 may be bonded to the described assembly. The cover sheet may be a thin plastic film coextensive with the backing strip 10 and provided with apertures (not shown) which are registered with the tabs 18 to provide access thereto.

The described gage, when bonded to a workpiece, is readily connected to leadout wires which may be easily soldered to the tabs 18. By having the tabs elongated in the direction of the angle $\theta$, an installer of the gage will be guided to form the solder joints with leadout wires along planes of essentially no strain. This further minimizes the chances of a fatigue failure since stresses in the solder joint are, for practical purposes, eliminated. It would be a further preferred practice to bond the leadout wires to the workpiece.

Various modifications of the preferred embodiment described will occur to those skilled in the art within the spirit and scope of the present inventive concepts which are therefore to be derived solely from the following claims.

Having thus described the invention, what is claimed as novel and desired to be secured by Letters Patent of the United States is:

1. A strain gage comprising
  a backing strip
  a strain grid bonded to the upper surface of the backing strip and comprising a relatively thin, elongated serpentine conductor having parallel lengths,
  said backing strip being adapted to be bonded to a test specimen with the parallel grid lengths aligned with the direction of major stress,
  said grid having terminal lengths at its opposite sides which are progressively widened toward the ends thereof, and
  a pair of relatively thick, elongated tabs bonded to said backing strip with integral connectors, also bonded to the backing strip, respectively extending to and bonded to the widened end of terminal lengths of the grid, said connectors being relatively thin at their ends which are bonded to the grid terminal lengths and progressively increasing in thickness along at least a portion of their lengths such that the thickness of said connectors approaches the thickness of said elongated tabs at the interconnection therewith, said tabs and the portions of the connectors extending from said terminal grid lengths being disposed on an angle $\theta$ of between about 45° and 65° relative to the direction of the lengths of the strain grid.

2. A strain gage as in claim 1 wherein
  the tabs and connectors are formed by beryllium copper or equivalent high fatigue strength, solderable material.

3. A strain gage as in claim 2 wherein
  the connectors, as they extend from said terminal lengths, are angled toward each other, both connectors are bent intermediate their lengths and angle outwardly on the same angle $\theta$ and the tabs are parallel and disposed generally within extensions of the sides of the strain grid.

* * * * *